2,143,565

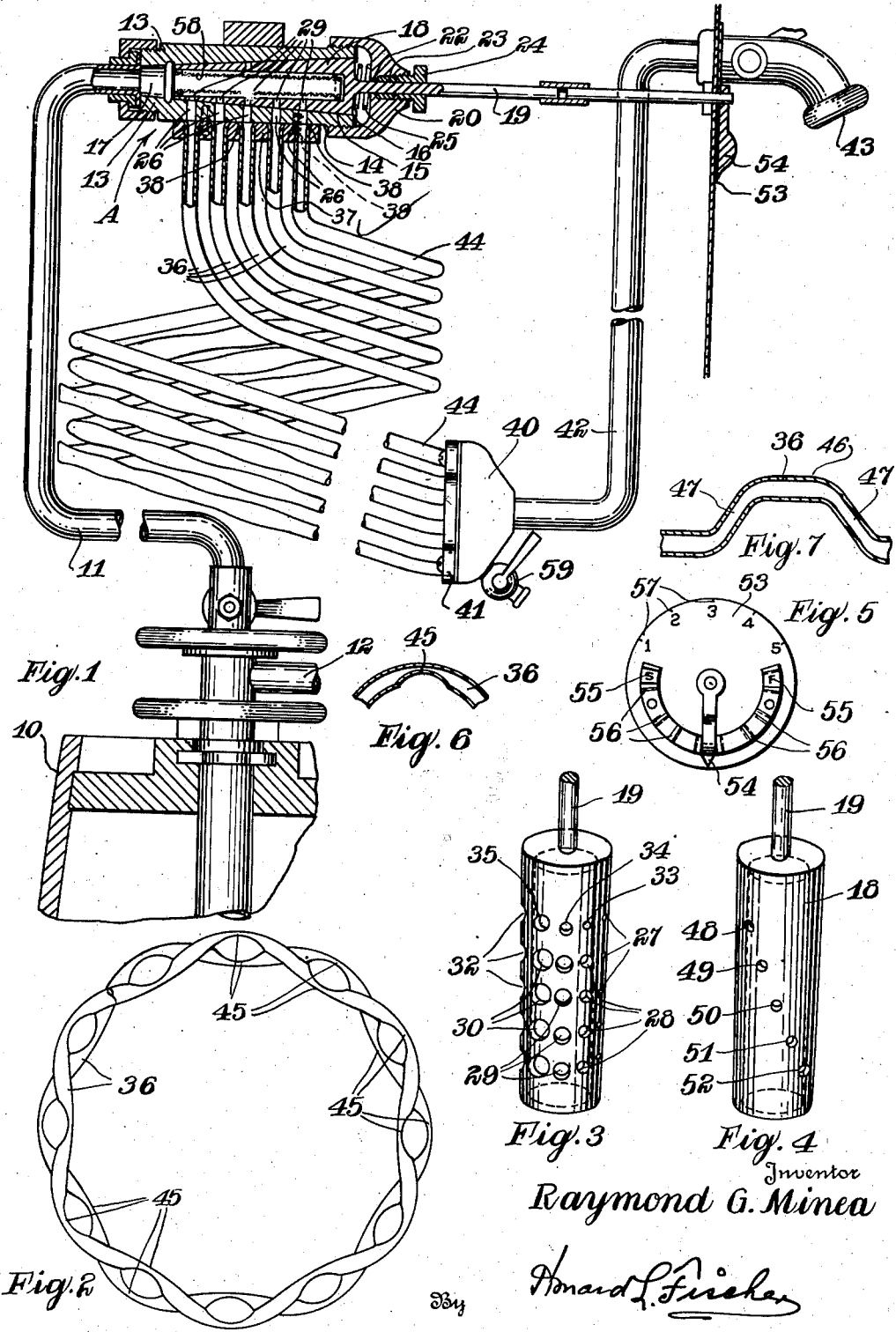
Jan. 10, 1939.    R. G. MINEA    2,143,565
BEER STABILIZER COIL CONTROL
Filed Nov. 4, 1935
Inventor
Raymond G. Minea Patented Jan. 10, 1939

UNITED STATES PATENT OFFICE 2,143,565

BEER STABILIZER COIL CONTROL

Raymond G. Minea, St. Paul, Minn.

Application November 4, 1935, Serial No. 48,101

7 Claims. (Cl. 225—1)

My invention relates to an improvement in regulator valves, particularly adapted for use in dispensing beer, ale, or the like; and to a dispensing apparatus for controlling the flow of the beer or other liquid through the valve.

In the present beer and ale dispensing systems with which I am aware, the beer flows through a cooling coil to the faucet. A keg of beer, before it is tapped, ordinarily contains somewhere in the neighborhood of twenty-five pounds of carbonic gas pressure. The flow of beer, however, is caused by air pressure in the keg. In usual cases, this air pressure is about ten pounds. Accordingly, until much of the carbonic gas under pressure has escaped, no air pressure can be added. It may thus be seen that most of the carbonic gas is quickly removed from the keg of beer by a system which is only designed to operate properly with a low air pressure. The first beer is therefore mostly foam; and once the carbonic gas has been removed, the beer quickly goes "flat", and does not have the proper taste.

It is therefore a purpose of my invention to provide a means of restricting the flow of carbonic gas from the beer keg, to retain a certain percentage of this gas in the keg until dispensed with the last portion of the beer. This I accomplish by providing a means of restricting the flow of the gas from the keg, and by using a pressure for causing the flow of the beer which is equal to or higher than the original carbonic gas pressure in the keg.

It is a further object of my invention to provide a valve adapted to receive the beer or other liquid and to deliver it through a conduit to a dispensing faucet. The valve is so arranged that the quantity of beer delivered to the faucet may be regulated as desired, so that the flow of beer from the faucet may be fast or slow as desired.

It is a further object of my invention to provide a valve which is capable of delivering the beer through a series of tubes arranged in parallel relationship to the faucet. Such smaller tubes restrict the flow of gas with the beer, and present a better cooling surface to the beer passing through the tubes.

In order to further restrict the flow of the gas with the beer, I may form the series of pipes leading from the valve toward the faucet with spaced restrictions. If desired, some or all of the series of pipes may contain these restrictions, which impede the flow of gas with the beer. Accordingly, when a new keg of beer is tapped at a time when the whole keg will probably not be used immediately, such as before closing time at night, by restricting the flow of the beer through my valve to the maximum, and restricting the flow additionally through the pipes which usually form cooling coils, the remaining beer in the keg may be kept with very little of the gas having been expelled.

It is an added feature of my invention that the beer may be delivered through a single tube of the series to the faucet if desired, thus permitting any of the tubes to be used without using all of the tubes. This is advantageous in case one tube becomes injured, or when one tube leaks, by serving as an emergency means for dispensing the beer. In some cases, it may be that additional tubes are not needed for dispensing purposes.

Another feature of my invention relies upon this same construction outlined in the preceding paragraph, for by this construction it is possible to clean out the tubes singly. Where a multiplicity of tubes are used for delivering the beer, as shown, the cleaning of the tubes would be a difficult problem if no means were provided whereby each tube could be cleaned separately. If no such means were provided, the steam or cleansing medium used would pass most freely through the least blocked tubes, and a high pressure could not well be built up in a tube wholly or partially blocked. My construction permits steam, introduced into the valve from either end of the system, to flow through but one pipe at a time by closing off all of the other pipes. The entire pressure of the cleaning medium is therefore directed through each pipe, cleaning the same efficiently.

These and other objects and novel features of my invention will be more clearly and fully set forth in the following specification and claims.

In the drawing forming a part of my specification:

Figure 1 illustrates diagrammatically a beer dispensing system, illustrating a cross-sectional view through my new type of valve.

Figure 2 is a plan view of a section of the coil.

Figure 3 is a perspective view of one side of the core of my valve, illustrating the construction thereof.

Figure 4 is a perspective view of the other side of the core of my valve, illustrating the construction thereof.

Figure 5 is an elevational front view of the indicating dial or gauge, disclosing the manner in which the valve may be regulated.

Figure 6 is a longitudinal sectional view of one of the pipes of the coil, illustrating one type of restriction therefor.

Figure 7 is a longitudinal sectional view of a slightly different form of coil pipe.

In my beer regulating system, the keg 10, a portion of which is diagrammatically illustrated in Figure 1, is tapped, and the tube or pipe 11 extends therefrom. The keg is also provided with a pipe 12 or inlet for supplying air under pressure to the keg 10.

The pipe 11 extends into, or is otherwise connected to, the casing 13 of the valve A. The casing is, in the form shown, substantially cylindrical in outer shape, and is provided with one flattened side 14 formed with adjacent bosses for a purpose which shall be presently described. The inside of the casing 13 is provided with a tapered bore 15 which is wider at the open end 16 of the casing 13. This bore 15 is in communication with the co-axial recess 17 in communication with the pipe 11 which connects to this end of the casing 13.

Within the tapered bore 15, and tapered to fit snugly against the casing 13, I provide a hollow rotatable value element 18. This valve element is equipped with a valve operating stem or rod 19 concentric with the valve element 18 and extending from the larger diameter end of the same. A cap 20 is threadably engaged with the open end 16 of the casing 13, and serves as a journal for the valve rod 19, which extends through a central opening 22 in this cap 20. A packing gland 23 having a suitable packing nut 24 is formed in this central opening 22 of the cap 20, to prevent leakage of the liquid within the valve. A spring 25 is interposed between the inside of the cap 20 and the larger diameter end of the valve element 18 to maintain the valve element in intimate contact with the tapered bore 15.

A plurality of spaced holes 26 are formed through the flattened side 14 of the casing 13. Several series of similarly spaced holes 27, 28, 29, 30 and 32 are drilled radially through the valve element 18, each series of drilled holes being positioned to register, in one rotary position of the valve element, with the spaced holes 26 in the casing 13. The first series of holes 27 are quite small in diameter, and are designed to limit the flow of liquid through the system very considerably. Each successive series of holes 28, 29, 30 and 32, are of larger diameter than the preceding series, so that the series of holes 32 are of largest diameter.

For a purpose which will be later described, I have shown the holes of some of the series nearest the larger diameter end of the valve element 18 out of conformity with the other holes of the respective series. For example, while the holes of the series 27 are all of equal size, the top hole 33 of the series of holes 28 is smaller than the other holes; the top hole 34 of the series of holes 29 is smaller than the other holes of the series; and the top hole 35 of the series 30 of holes is smaller than the other holes of the series. This is to provide a restriction at this point, the purpose of which will be better understood presently.

A plurality of cooling tubes 36, equal in number to the holes 26 in the casing 13, are extended through a connecting block 37, and are secured firmly in this position by flaring the end 38 of each of the tubes 36 adjacent the inner surface of this connecting block. The connecting block 37 is attached to the flattened side 14 of the casing 13 by screws 39 or other suitable means. The attachment of this block 37 places the tubes 36 in registry with the holes 26 in the casing 13. The other ends of the tubes 36 are extended into a connector member 40 which connects with all of the tubes. The tubes are flared at the end to hold them in the connecting block 41 of the connector 40. This construction permits the tubes to be disconnected and any single tube which leaks or becomes fouled may be plugged at one or both ends. The connector member 40 is provided with a single pipe or tube 42 terminating at the faucet 43 from which the beer or liquid is to be dispensed.

In the form of construction shown in Figure 1, each of the pipes 36 of the coil, with the exception of the upper pipe 44, is provided with restrictions therein to impede the flow of gas with the beer. These restrictions may be in the form illustrated in Figure 6, where the tube 36 is shown with the inner wall thereof pinched quite close at 45 to the outer wall of the tube. Other forms of restrictions may be used, as in Figure 7. This figure illustrates offset portions 46 which occur at spaced intervals throughout the length of the pipe, and which involve pinched or restricted portions 47. The top pipe or tube 44 provides a slightly less restricted flow of liquid and assures the proper operation of the valve. The use of the smaller holes 33, 34 and 35 in the valve element 18, with which the pipe 44 may register, acts to impede the direct flow through this upper pipe 44 to prevent a loss of pressure in the other pipes or tubes 36. If desired, the top tube or one or more of the top tubes, could be made of larger diameter to provide a less restricted flow.

In order that each of the pipes 36 can be thoroughly cleaned, I provide openings 48, 49, 50, 51 and 52, through the valve element 18. Each of these openings is separately registrable with one of the holes 26 in the casing 13. Thus by placing the valve element 18 in different rotative positions, these holes may be separately registered with one of the holes 26, either to deliver liquid through the pipe connected with that particular hole 26, or to permit the flow of some cleaning agent, such as steam, through the particular pipe selected.

In order to indicate the position of the valve element 18, I provide an indicator plate 53 through which the valve rod 19 extends. An operating pointer 54 is provided on the rod 19 by means of which the rotative position of the valve element 18 may be changed. The indicator plate 53 bears indicia 55 to show the proper position of the pointer 54 to provide a fast or slow flow of the liquid from the faucet 43. Spring shoulders 56 properly position the pointer 54, or assist the operator in determining the proper position of the pointer. Indicia 57 is also provided to show the proper position of the pointer 54 to cause each separate tube 36 to be connected with the source of liquid supply through one of the openings 48, 49, 50, 51 or 52.

The operation of the device is believed clearly understood from the above description. By the indicating pointer 54, the valve element 18 may be rotated to provide a fast or slow flow through all of the tubes; or to connect each tube separately. In a similar manner other combinations of pipes could be connected to operate simultaneously. The flow of the beer through a series of small tubes, and the restricting of the flow by various means, is of material assistance in preventing escape of gas with the beer, causing the last of the beer within a keg to taste as good as the first, even after standing a considerable time.

A cylindrical screen 58 within the valve element 18 acts to strain the beer and to prevent the passage of foreign matter into the pipes 36 to block the same.

It will be noted that in the present form, a drain cock 59 is provided by means of which the valve, coils, and delivery pipe 42 can be entirely drained if desired.

In accordance with the patent statutes, I have described the principles of operation of my beer regulating valve for dispensing systems, and while I have endeavored to set forth the best embodiment thereof, I desire to have it understood that this is only illustrative of a means of carrying out my invention, and that obvious changes may be made within the scope of the following claims without departing from the spirit of my invention.

I claim:

1. A beer dispensing apparatus including a supply pipe adapted to be connected to a source of supply, a valve in said supply pipe, a plurality of tubes extending from said valve and adapted to be connected by said valve with said supply pipe, means restricting some of said pipes more than others, a connector for said tubes, and a faucet connected to said connector to receive the beer therefrom and from said plurality of tubes.

2. A dispensing apparatus including a supply pipe adapted to be connected to a source of supply of liquid, a valve in said supply pipe to regulate the amount of flow of liquid therethrough, a series of cooling coils connected in parallel to said valve, said valve varying the flow through each coil and a dispensing faucet connected to said cooling coil to receive and dispense the cooled liquid.

3. A dispensing apparatus for beverages including a supply pipe adapted to be connected to a source of supply, a dispensing faucet, and a series of tubes connected in parallel between said source of supply and said dispensing faucet to convey the beverage from said supply pipe to said dispensing faucet, means varying the amount of flow through all of said tubes collectively, and means restricting some of said tubes more than others.

4. A dispensing apparatus for beverages including a supply pipe, a dispensing faucet, a series of pipes connecting said supply pipe to said dispensing faucet, and means for varying the flow of the beverage through all of said pipes collectively, some of said pipes being more restricted than others.

5. A dispensing apparatus for liquids including a supply pipe adapted to be connected to a source a supply, a valve in said supply pipe, a dispensing faucet, a series of pipes in parallel connecting said valve to said dispensing faucet, and means in said valve operable to regulate the amount of flow of liquids through each pipe of said series of pipes to said faucet.

6. A dispensing apparatus for liquids including a supply pipe adapted to be connected to a source of liquid supply, a valve in said supply pipe, a dispensing faucet, a series of pipes connecting said valve to said faucet, means in said valve for regulating the flow of liquid through said series of pipes, and means in said valve for directing the liquid flow to any pipe of said series individually to direct all of the pressure through any pipe of said series.

7. A beverage dispenser including a supply pipe adapted to be connected to a source of supply, a valve in said supply pipe, a dispensing faucet, a series of pipes connecting said valve with said dispensing faucet, and means in said valve for connecting said supply pipe selectively with any one pipe of said series of pipes.

RAYMOND G. MINEA.